(12) United States Patent
Soller et al.

(10) Patent No.: US 11,731,370 B2
(45) Date of Patent: Aug. 22, 2023

(54) APPARATUS AND METHOD FOR SECURING A ZIPPER CLOSURE TO POLYMERIC FILM

(71) Applicant: Reynolds Presto Products Inc., Lake Forest, IL (US)

(72) Inventors: Craig Soller, Farmington, NY (US); Carlos Chapek, Victor, NY (US); Zachary Thompson, Canandaigua, NY (US); Aaron Wells, Honeoye Falls, NY (US); Gregory Heckman, Menasha, WI (US)

(73) Assignee: Reynolds Presto Products Inc., Lake Forest, IL (US)

( * ) Notice: Subject to any disclaimer, the term of this patent is extended or adjusted under 35 U.S.C. 154(b) by 0 days.

(21) Appl. No.: 17/713,644

(22) Filed: Apr. 5, 2022

(65) Prior Publication Data
US 2022/0227068 A1 Jul. 21, 2022

Related U.S. Application Data

(62) Division of application No. 16/252,070, filed on Jan. 18, 2019, now Pat. No. 11,577,472.

(51) Int. Cl.
*B29C 65/60* (2006.01)
*B29C 65/78* (2006.01)
(Continued)

(52) U.S. Cl.
CPC ........ *B29C 65/609* (2013.01); *B29C 65/7873* (2013.01); *B31B 70/10* (2017.08);
(Continued)

(58) Field of Classification Search
CPC ... B29C 65/02; B29C 65/609; B29C 65/7873; B29L 2031/7128; B31B 70/8132;
(Continued)

(56) References Cited

U.S. PATENT DOCUMENTS 4,617,080 A * 10/1986 Kobayashi ............ B44C 1/1712
156/542
5,131,121 A 7/1992 Herrington, Jr. et al.
(Continued)

FOREIGN PATENT DOCUMENTS

EP 0928244 B1 * 9/2006

OTHER PUBLICATIONS

International Search Report and Written Opinion for Application No. PCT/US2020/013132 dated Apr. 22, 2020, 19 pages.

*Primary Examiner* — Philip C Tucker
*Assistant Examiner* — Jimmy R Smith, Jr.
(74) *Attorney, Agent, or Firm* — Merchant & Gould P.C.

(57) ABSTRACT

A method and apparatus for securing a zipper closure to polymeric film using minimal tension on the zipper closure includes providing first and second tension control loops, an eyemark detector, and a hole punch programmed to punch a hole in the zipper closure upon detection of the eyemark. The zipper closure and the film are supplied to a sealing station at the same speed, and the hole zipper closure is aligned with the eyemark on the film, to result in sealing the strip of zipper closure to the film resulting in minimal wrinkles to the resulting bag.

7 Claims, 2 Drawing Sheets

(51) Int. Cl.
  *B65D 33/25* (2006.01)
  *B32B 38/18* (2006.01)
  *B31B 70/10* (2017.01)
  *B29C 65/02* (2006.01)
  *B29L 31/00* (2006.01)

(52) U.S. Cl.
  CPC ...... *B32B 38/1833* (2013.01); *B65D 33/2508* (2013.01); *B29C 65/02* (2013.01); *B29L 2031/7128* (2013.01)

(58) Field of Classification Search
  CPC . B31B 70/10; B65D 33/2508; B32B 38/1833; B32B 37/0053; B32B 39/00; B32B 38/1825; B32B 38/1875; B32B 38/1841; B32B 2014/04; B65H 23/1888; B65H 2511/112; B65H 39/16
  See application file for complete search history.

(56) References Cited

U.S. PATENT DOCUMENTS

| | | | |
|---|---|---|---|
| 5,276,950 A | 1/1994 | Johnson | |
| 5,906,438 A | 5/1999 | Laudenberg | |
| 6,780,263 B2 | 8/2004 | Delisle | |
| 6,863,754 B2 * | 3/2005 | Wright | B29C 69/005 156/64 |
| 9,505,189 B2 | 11/2016 | Murray et al. | |
| 2012/0289389 A1 * | 11/2012 | Murray | B31B 70/006 493/193 |

* cited by examiner

APPARATUS AND METHOD FOR SECURING A ZIPPER CLOSURE TO POLYMERIC FILM

CROSS REFERENCE TO RELATED APPLICATION

This application is a divisional application of U.S. application Ser. No. 16/252,070, filed Jan. 18, 2019, the complete disclosure as filed being incorporated herein by reference.

TECHNICAL FIELD

This disclosure relates to a method and apparatus for securing a zipper closure to polymeric film. More specifically, this disclosure relates to an apparatus and method for securing the zipper closure to the film using minimal tension.

BACKGROUND

U.S. Pat. No. 5,906,438, incorporated herein by reference, describes a flexible pouch-type bag (package) having a recloseable closure and a method of making it. In many typical recloseable bags, the zipper closure is pre-made by an extrusion process and then secured to a bag film. The zipper closure can be a "press to close" type of closure having a protruding male member that is received by a female groove. These are known as the zipper interlocking members. Other types of closures can also be used, including, e.g., closures having slider devices.

The zipper closures are pre-made into a continuous strip and stored by coiling around a roll. The packages are made by feeding a continuous web or sheet of polymeric film from a roll and folded so that half the sheet forms a front panel and the other half forms a rear panel. The continuous strip of zipper closure is fed between the panels and then bonded, typically by heat, to the opposing panels. Side seals are formed by heat between the opposing panels transverse to the direction of the zipper closure. The packages are separated along parting lines by a cutting process along the side seals.

In existing technologies, a dancer mechanism is used that has only a crude control of the tension on the strip of zipper closure. This can result in packages in which the film is wrinkled or deformed. Improvements are desirable.

SUMMARY

In one aspect, a method of securing a zipper closure to polymeric film using minimal tension on the zipper closure is provided. The method includes paying out a continuous strip of plastic zipper closure from a roll of zipper closure; paying out polymeric film from a film roll, the polymeric film having periodic eyemarks thereon; passing the strip of zipper closure through a tension control mechanism; passing the strip of zipper closure through a first tension control loop; advancing the film toward a sealing station and past an eyemark detection to detect an eyemark on the film; after detection of the eyemark on the film, punching a hole into the strip of zipper closure upon detection of the eyemark on the film; passing the strip of zipper closure with a punched hole through a second tension loop; applying the strip of zipper closure to the sealing station while simultaneously supplying the film to the sealing station at the same speed as the strip of zipper closure; aligning the hole in the strip of zipper closure with the eyemark on the film; and sealing the strip of zipper closure to the film.

In some embodiments, the step of sealing includes sandwiching the strip of zipper closure between two walls of the film and using heated sealing bars to transfer heat to the strip of zipper closure and the film.

The step of sealing can include using three sets of opposing sealing bars.

In some implementations, the step of sealing includes using opposing sealing bars, with a first of the opposing sealing bars controlling sealing pressure and a second of the opposing sealing bars controlling distance between the sealing bars.

In some methods, there are steps of detecting a position of the eyemark; detecting a position of the hole; comparing a distance between the detected eyemark and the detected hole to a predetermined target value; and if distance is not equal to the target value, adjusting a length of an index distance so that the distance becomes equal to the target value.

In some methods, the step of passing the strip of zipper closure through a first tension control loop includes threading the strip of zipper closure under a weighted disk movable up and down by gravity to provide constant tension to the strip of zipper closure.

In some methods, the step of passing the strip of zipper closure through a second tension loop includes threading the strip of zipper closure under a weighted disk movable up and down by gravity to provide constant tension to the strip of zipper closure.

The method can include, after the step of detecting an eyemark on the film, a step of folding the film.

The step of sealing can include using multiple sets of opposing guide rollers to guide the position of the strip of zipper closure relative to the film.

In a further aspect, an apparatus for securing a zipper closure to polymeric film using minimal tension on the zipper closure is provided. The apparatus includes a tension control mechanism to provide at least some tension to a strip of zipper closure. A first tension control loop is downstream of the dancer mechanism. An eyemark detector is positioned to detect an eyemark on the film. A hole punch is downstream of the first tension control loop and programmed to punch a hole in a strip of zipper closure upon detection of an eyemark on the film. A second tension control loop is downstream of the hole punch. A sealing station is downstream of the second control loop and of the eyemark detector and constructed and arranged to seal a strip of zipper closure to the film.

In one or more embodiments, the first tension control loop includes a weighted disk movable up and down by gravity.

In some embodiments, the second control loop can include a weighted disk movable up and down by gravity.

The apparatus can further include an aperture detector downstream of the second control loop and upstream of the sealing station. The apparatus can also include a controller to compare a distance between the detected eyemark and the detected hole.

In some embodiments, the sealing station includes at least a first set of opposing sealing bars, with a first of the opposing sealing bars controlling sealing pressure and a second of the opposing sealing bars controlling distance between the sealing bars.

The sealing station can include three sets of opposing sealing bars, in some embodiments.

In a further aspect, a system for sealing a zipper to a film is provided. The system includes: a zipper roll station and a film roll station from which the zipper and film are paid out, respectively; a dancer mechanism for tensioning zipper from the zipper roll station; a minimal tension loop and a nip; an earmark detector, a punch, and an aperture detector; a sealing station; and a controller for receiving signals from the earmark detector and aperture detector and transmitting signals to the nip. The nip receives instructions from the controller and operates to feed zipper to the minimal tension control loop so that the nip and minimal tension control loop operate in an index and dwell mode such that the zipper and film are fed to the sealing station at the same speed, and the zipper tension upon entering the sealing station is between 0.05 lbs and 0.7 lbs.

In some systems, the zipper tension, upon entering the sealing station, is less than 0.2 lbs.

In some embodiments, the zipper tension, upon entering the sealing station, is about 0.1 lbs.

A variety of examples of desirable product features or methods are set forth in the description that follows, and in part, will be apparent from the description, or may be learned by practicing various aspects of this disclosure. The aspects of this disclosure may relate to individual features, as well as combinations of features. It is to be understood that both the foregoing general description and the following detailed description are explanatory only, and are not restrictive of the claimed inventions.

DETAILED DESCRIPTION

A method and apparatus are described below, which results in improvements over the prior art. For example, the aesthetics of the packages, or bags, are improved, as the polymeric film does not wrinkle or deform. The zipper closure has a periodic mass of material removed from it, which needs to be aligned with eyemarks on the film indicating the position of the parting lines of the bags. The mass of material removed corresponds to the interlocking elements of the press-to-close zipper. The interlocking elements are much thicker than the rest of the zipper flange. In prior art processes, when the side seals of the bags are made, these thick interlocking members are flattened out by the sealing bars, and this delays the sealing process. By punching out the interlocking members, the sealing time is reduced. The method and apparatus described below ensures precise alignment of the removed mass of material in the zipper closure with the eyemarks, while maintaining the same minimal tension in the zipper closure and bag film to result in advantages. Other advantages that result include reducing instances of overheating or underheating film and a zipper closure, when the zipper closure is sealed to the film. This advantage is achieved by ensuring that the sealing perimeters, including pressure, sealing time, and the gap between opposing sealing bars, are controlled.

Figure 1:
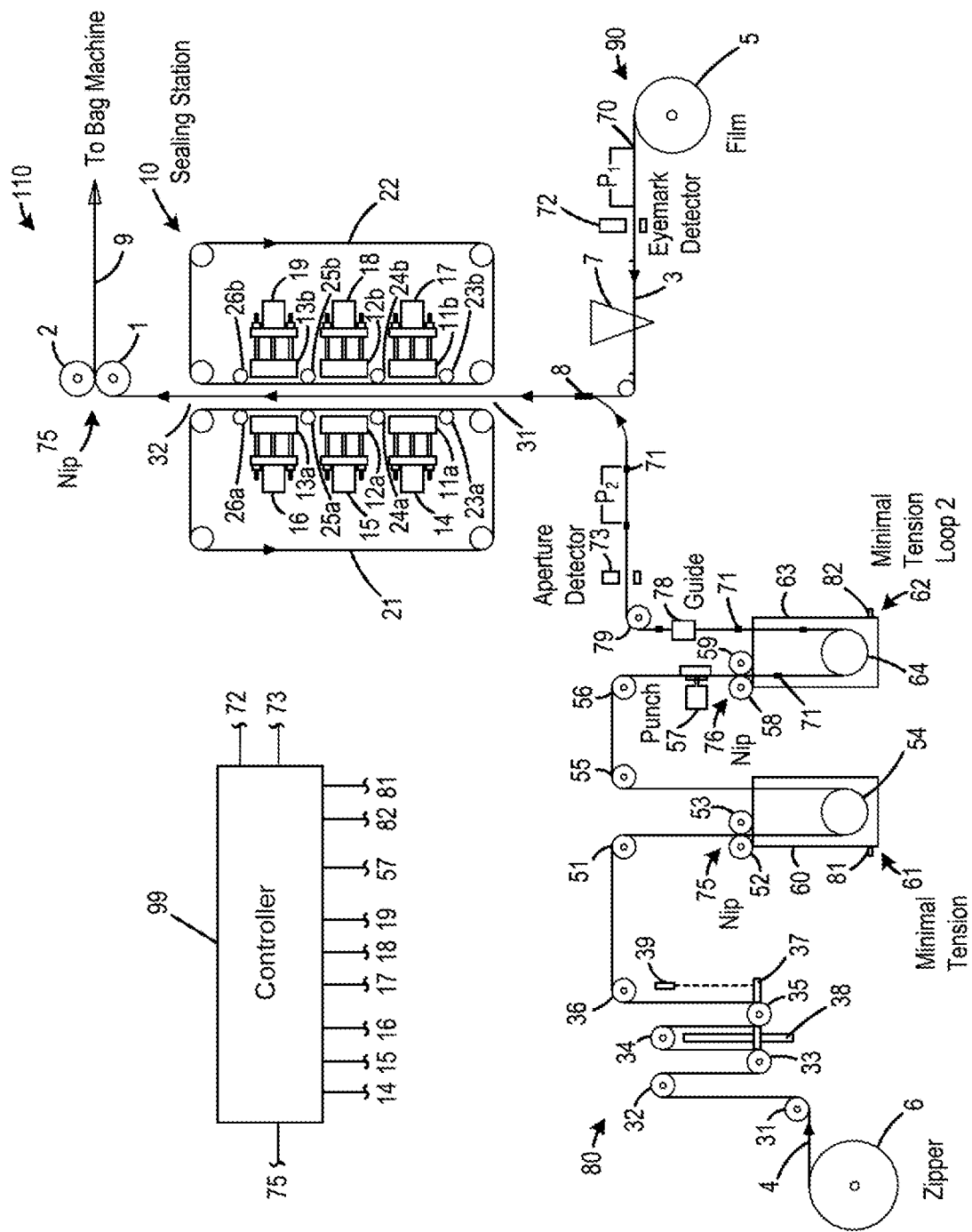
FIG. 1 is a schematic illustration of an apparatus and process for securing a zipper closure to polymeric film.

Reference is made to FIG. 1. FIG. 1 shows an apparatus 110 for securing a zipper closure 4 to polymeric film 3.

A roll 6 having a continuous strip of the plastic zipper closure 4 coiled therearound is provided. The method includes a step of paying out the continuous strip of zipper closure 4 from the roll 6 and passing the strip of zipper closure 4 through a tension control mechanism, embodied herein as a dancer mechanism 80.

The dancer mechanism 80 provides at least some tension to the strip of zipper closure 4. The dancer mechanism 80 includes a plurality of guiding rollers 31, 32, 33, 34, 35 and 36. The guiding mechanism 80 further includes a carriage bar 37 and carriage guide 38.

The dancer mechanism 80 can be the type of tensioning mechanism that is described in U.S. Pat. No. 5,276,950, incorporated herein by reference. The guiding rollers 31, 32, 34 and 36 are stationary and are fixed permanently to a frame of the apparatus 110. The guiding rollers 33 and 35 are mounted on the carriage bar 37, which moves up and down along the carriage guide 38. A sensor 39, which is fixed, continuously detects the position of the carriage bar 37. If the carriage bar 37 goes up beyond a certain height, the detector sends a signal to the controller 99 so that the motor controlling the roll 6 causes rotation of the roll 6 to an unwind further zipper closure 4. Unwinding of further zipper closure 4 causes the carriage bar 37 to go downward. Once the carriage bar 37 has reached a minimum height, another signal is sent to the controller 99 to stop rotation and dispensing zipper closure 4. This cycle is continuously repeated while apparatus 110 is in operation.

The method further includes a step of passing the strip of zipper closure 4 through a first tension control loop 61. The first tension control loop 61 is located downstream of the dancer mechanism 80. The first tension control loop 61 is provided to result in a minimum tension needed to keep the zipper closure 4 linear and to prevent entanglement. A weighted disk 54 is provided, and the zipper closure 4 is threaded under the weighted disk 54. The weighted disk 54 is movable up and down by gravity to provide a constant tension to the zipper closure 4. The zipper closure 4 and the weighted disk 54 are contained within a loop box 60. A sensor 81 provides feedback to the controller 99 to keep the zipper closure 4 inside the loop box 60.

Still in reference to FIG. 1, it can be seen how the zipper closure 4 is threaded around guide roller 51 and into nip 75 between guide rollers 52 and 53. After nip 75, the zipper closure enters the loop box 60 and is threaded around the weighted disk 54.

As can be appreciated by comparing the tension loop 61 with the dancer mechanism 80, in the tension loop 61, there are no rotating arms or sliding members that have frictional force affecting the tension of the zipper closure 4. This helps to result in better control of the tension than the in the dancer mechanism 80.

The apparatus 110 and method includes a step of paying out polymeric film 3 from a film roll 5. The film 3 has periodic eyemarks thereon. The eyemarks are for indicating parting lines where the side seals and cutting will be to create the individual bags or packages. The eyemarks 70 appear at a regular pitch P. In general, the pitch distance P is constant throughout the roll of film 3, but the placement accuracy of the eyemarks 70 can vary within the roll 5.

The film 3 is advanced toward a sealing station 10. While it is being advanced, an eyemark detector 72 is provided to detect the eyemark 70 on the film 3. The eyemark detector 72 sends a signal to the controller 99 to indicate that the eyemark 70 has been detected.

After the eyemark 70 is detected on the film 3, the film 3 is guided around a triangle board 7 to be folded into a desired shape. Typically, this will involve forming the film 3 to have a U-shape, and result in opposing panels with a fold between the opposing panels. At an open side of the folded film 3 is where the zipper closure 4 will be provided.

Figure 2:
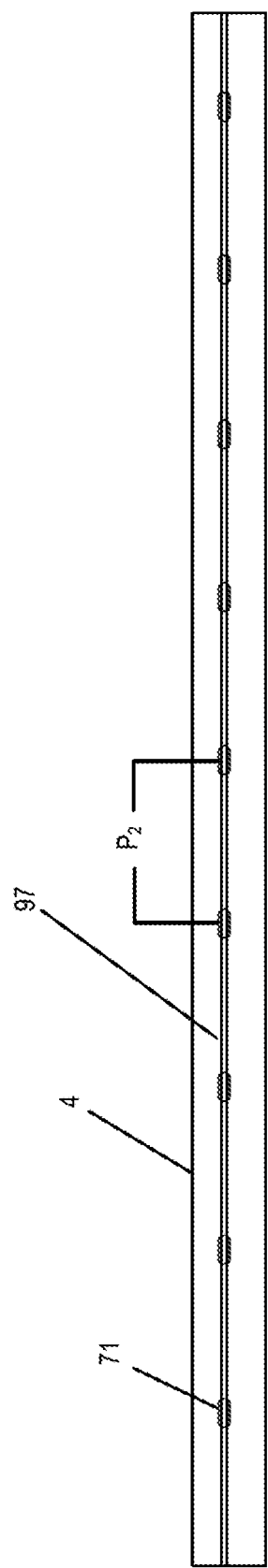
FIG. 2 is a front view of a zipper closure with periodic holes, used in the process depicted in FIG. 1.

As mentioned previously, the eyemark detector 72 sends a signal to the controller 99, which captures the position of the nip 75. The nip 75 is servo-controlled and has a rotational encoder for keeping track of the position of the film 3. After the eyemark 70 has been detected, an aperture or hole 71 is punched into the zipper closure 4 at the hole punch 57. The hole punch 57 is located downstream of the first tension control loop 61. FIG. 2 illustrates the zipper closure 4 having periodic holes 71 therein, separated by distance P2 and interlocking members 97.

Once the zipper closure 4 passes the punching operation, the zipper closure 4 is passed on to the second tension control loop 62. The second tension control loop 62 helps to ensure that the zipper closure 4 that has been punched with hole 71 is maintained with minimal tension, such that the zipper closure 4 is straight and untangled. The second tension control loop 62 also allows for the stopping of the zipper which is necessary for actuating hole punch 57. The second tension loop 62 is preceded by a driven nip 76 to introduce the punched zipper closure 4 into a loop box 63. The nip 76 includes a pair of rollers 58, 59.

Nip 76 runs in an index and dwell repeat sequence. The controller 99 controls nip 76, and during the index portion of the sequence, the nip 76 runs for a given distance generally close to, or equal to, the pitch distance P (FIG. 2). The distance that the nip 76 runs in a given index will vary when the system is making adjustments to align the eyemark 70 to the detected hole 71. Nip 76 stops in a dwell between indexes to allow for the actuation of hole punch 57.

The second tension control loop 62 is constructed similarly as the first tension control loop 61. A weighted disk 64 moves up and down by force of gravity, and the punched zipper closure 4 is threaded under the weighted disk 64. The disk 64 provides the punched zipper closure 4 at a constant tension. A detector 82 monitors the level of the punched zipper closure 4 within the loop box 63 and is used as an indication that nip 76 needs to run to keep a loop. Both the loop box 60 and 63 are open in the bottom.

After passing through the second tension control loop 62, the punched zipper closure 4 proceeds through the guide 78 and around guiding roller 79.

An aperture detector 73 is provided downstream of the second tension control loop 62, and in this embodiment, downstream of the guide 78 and roller 79. The aperture detector 73 detects the aperture or hole 71 in the zipper closure 4. After the eyemark 70 is detected by the eyemark detector 72, the position of film nip 75 is captured by controller 99. Then the aperture detector 73 detects hole 71, and the controller 99 captures this position of film nip 75. The controller 99 is able to calculate the distance between the detected eyemark 70 and the detected hole 71. The controller 99 compares this distance to the target value that has been entered into controller 99 by the operator. If the compared distances are not equal, controller 99 will adjust the length of the index distance by nip 76 so that they will become equal. If the compared distances are equal, but the hole 71 is not lined up with the eyemark 70, then the operator is able to perform a step of calibrating the apparatus 110 and provide a correction. The correction can be performed by adjusting the target value entered into controller 99.

By having eyemark detector 72 and aperture detector 73, in addition to controller 99 that receives the position of both the locations and then automatically adjusts the distance between the holes 71 by changing the index distance from nip 76, advantages are realized. The advantages include being able to accurately line up the holes 71 in the zipper closure 4 with the film eyemarks 70, in spite of variations and tension on the zipper closure 4 on the roll 6, variations in the tension of the film 3, or variations in the distance between printed eyemarks 70 on the film 3.

The method includes the step of supplying the strip of zipper closure 4 to the sealing station 10, while simultaneously supplying the film 3 to the sealing station 10 at the same speed as the strip of zipper closure 4. The sealing station 10 is downstream of the second tension control loop 62 and aperture detector 73, as well as being downstream of the eyemark detector 72.

Although the zipper closure 4 is stopped intermittently for punching the holes 71, the accumulation of a sufficient length of zipper closure 4 in the dancer mechanism 80 and tension control loops 61, 62 allows the zipper closure 4 to be supplied continuously to the sealing station 10 at the same net speed that the film 3 is supplied. The holes 71 in the zipper closure 4 are lined up with the eyemarks 70 with the zipper closure 4 at minimal tension, so that minimum wrinkles are formed after the bag is made.

The method further includes sealing the strip of zipper closure 4 to the film 3. The sealing step is done while the hole 71 is aligned with the eyemark 70.

During the step of sealing, the strip of zipper closure 4 is sandwiched between two opposing walls of the film 3, and heated sealing bars transfer heat to the film 3 and zipper closure 4. In this embodiment, there are three pairs of opposed heating sealing bars, shown at 11a and 11b; 12a and 12b; and 13a and 13b. The sealing bars 11a, 12a, and 13a extend and retract by actuation of air cylinders 14, 15, and 16. The air cylinders 14, 15, 16 are controlled by electropneumatic regulators, which accurately control sealing pressure. The controller 99 sends signals to the air cylinders 14, 15, 16 to extend and retract the sealing bars 11a, 12a, and 13a.

The sealing bars 11b, 12b, and 13b are mounted on rod-type electric actuators 17, 18, 19 that accurately control the amount of extension and retraction. All of the sealing bars 11, 12, 13 includes electric heaters and thermocouples to control the temperature of the sealing bars by way of a programmable controller having an operator interface.

Sealing of the zipper closure 4 to the film 3 is accomplished by extending the heating sealing bars 11, 12, 13 toward the moving film 3 and applying pressure on Teflon belts 21, 22 disposed between the film 3 and the opposing sealing bars. The belts 21, 22 rotate continuously in their respective loops. The belts 21, 22 move synchronously with the film 3 and zipper closure 4 and are in contact with opposing edges of the film 3.

Depending on the linear speed of the film 3, a selected number of the sealing bars will be actuated for sealing. That is, only a single set of the opposed sealing bars, two sets of the opposed sealing bars, or all three sets of the opposed sealing bars can be used. At lower film speeds, only one pair of the opposing sealing bars may be actuated. At intermediate film speeds, two sets of the sealing bars may be actuated. At the highest speed, all three sets of sealing bars can be actuated. This results in advantages in that less film 3 and zipper closure 4 is wasted, as there are fewer instances of overheating or underheating.

As can be appreciated from the above, by having independent control of single sets of opposed sealing bars, any unsealed film 3 and zipper closure 4 located between sealing bars 11a & 11b and 13a & 13b which did not get sealed together during normal line stops will be sealed completely during the process startup. During process startup, sealing bars 11a & 11b extend towards the moving film 3 and apply pressure on the Teflon belts 21 & 22 sealing film 3 and zipper closure 4 together. At the same time, controller 99 instructs sealing bars 13a & 13b to extend towards the moving film 3 and apply pressure on the Teflon belts 21 &

22 sealing film 3 and zipper closure 4 together. Depending on the linear speed of the film 3, controller 99 will retract 13a & 13b so as not to overheat film 3 and zipper closure 4. Sealing bars 11a & 11b will remain in the extended position to seal film 3 and zipper closure 4 together. This operation is helpful to a reduction, or in many cases, elimination of wasted film 3 and zipper closure 4 not sealing together and being rejected by the downstream processing equipment.

After the film 3 and zipper closure 4 are processed through the sealing station 10, they are advanced to a bag machine for product filling and for final bag sealing. Because the holes 71 remove the interlocking members of the zipper 71 at the parting lines between the bags, the amount of heat required to make the final seals is lower as compared to if the holes 71 were not provided.

As can be appreciated from the above, the first and second tension control loops 61, 62 help to deliver the zipper closure 4 with minimal tension at the time of attachment of the zipper closure 4 to the film 3, while ensuring accurate alignment of the holes 71 with the film eyemarks 70. This results in individual bags that are wrinkle free. The minimal tension is a tension less than 0.8 lbs, and is typically between 0.05 lbs and 0.7 lbs. In many preferred systems and methods, the tension is less than 0.2 lbs, indeed often less than 0.15 lbs. In an example system, the tension is about 0.1 lbs.

Modifications can be made to this process and still result in the above advantages. For example, three tension control loops can be used instead of a dancer mechanism and two tension control loops. Alternatively, only one tension control loop can be used.

The above represents example principles. Many embodiments can be made using these principles.

What is claimed is:

1. An apparatus for securing a zipper closure to a polymeric film using minimal tension on the zipper closure; the apparatus comprising:
    (a) a tension control mechanism to provide at least some tension to a strip of zipper closure;
    (b) a first tension control loop downstream of the tension control mechanism;
    (c) an eyemark detector positioned to detect an eyemark on the film;
    (d) a hole punch downstream of the first tension control loop and programmed to punch a hole in the strip of zipper closure upon detection of the eyemark on the film;
    (e) a second tension control loop downstream of the hole punch; and
    (f) a sealing station downstream of the second tension control loop and of the eyemark detector and constructed and arranged to seal the strip of zipper closure to the film.

2. The apparatus of claim 1 wherein the tension control mechanism comprises a dancer mechanism.

3. The apparatus of claim 1 wherein the first tension control loop includes a weighted disk movable up and down by gravity.

4. The apparatus of claim 1 wherein the second tension control loop includes a weighted disk movable up and down by gravity.

5. The apparatus of claim 1 further comprising:
    (a) an aperture detector downstream of the second tension control loop and upstream of the sealing station; and
    (b) a controller to compare a distance between the detected eyemark to a fixed position downstream of the sealing station, and a distance between a detected hole to the fixed position downstream of the sealing station.

6. The apparatus of claim 1 wherein the sealing station includes at least a first set of opposing sealing bars, with a first bar of the opposing sealing bars controlling sealing pressure and a second bar of the opposing sealing bars controlling distance between the sealing bars.

7. The apparatus of claim 6 wherein the sealing station includes 3 sets of opposing sealing bars.

* * * * *